United States Patent
Ueki

(10) Patent No.: US 9,672,453 B2
(45) Date of Patent: Jun. 6, 2017

(54) DATA PROCESSING APPARATUS AND PRINT DATA GENERATING METHOD DETERMINING A DOT ARRANGEMENT PATTERN USING A CODE TABLE

(71) Applicant: CANON KABUSHIKI KAISHA, Tokyo (JP)

(72) Inventor: Hideyuki Ueki, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/836,704

(22) Filed: Aug. 26, 2015

(65) Prior Publication Data
US 2016/0063364 A1 Mar. 3, 2016

(30) Foreign Application Priority Data

Sep. 2, 2014 (JP) .................................. 2014-178078
May 29, 2015 (JP) .................................. 2015-110573

(51) Int. Cl.
| | |
|---|---|
| G06K 15/02 | (2006.01) |
| G06K 15/10 | (2006.01) |
| H04N 1/40 | (2006.01) |
| H04N 1/405 | (2006.01) |

(52) U.S. Cl.
CPC ....... *G06K 15/1843* (2013.01); *G06K 15/107* (2013.01); *G06K 15/1802* (2013.01); *G06K 15/1848* (2013.01); *H04N 1/40* (2013.01); *H04N 1/405* (2013.01)

(58) Field of Classification Search
CPC combination set(s) only.
See application file for complete search history.

(56) References Cited

U.S. PATENT DOCUMENTS

| | | | |
|---|---|---|---|
| 9,064,202 B2 | 6/2015 | Tanaka | |
| 2005/0122377 A1* | 6/2005 | Mizutani | B41J 2/2132 347/41 |
| 2008/0123148 A1* | 5/2008 | Takahashi | G06K 15/107 358/3.13 |
| 2008/0246793 A1* | 10/2008 | Seki | B41J 2/2107 347/15 |
| 2009/0103140 A1* | 4/2009 | Yamamoto | H04N 1/32144 358/3.09 |

(Continued)

FOREIGN PATENT DOCUMENTS

JP 2014-31001 2/2014

*Primary Examiner* — Henok A Shiferaw
(74) *Attorney, Agent, or Firm* — Fitzpatrick, Cella, Harper & Scinto

(57) ABSTRACT

A data processing apparatus includes a holding unit holding a code table, in which each of the codes in the table determines the dot arrangement pattern, a determining unit determining a predetermined number of first offset values which is power of 2, the first offset values denoting a number of pixels by which an arrangement of the codes is shifted in the code table, a table generating unit, in a case where a size of the code table is not power of 2 and the determining unit determines the first offset value wherein a quotient and a remainder when the predetermined number is divided by the size is 1 or more, determining a second offset value wherein the quotient is zero, as substitute for the determined first offset value, and to generate the code table to which an offset is made with the second offset value.

30 Claims, 14 Drawing Sheets

(56) References Cited

U.S. PATENT DOCUMENTS

| | | | |
|---|---|---|---|
| 2014/0028776 A1* | 1/2014 | Kawamura | G02B 26/127 347/249 |
| 2016/0191747 A1* | 6/2016 | Katsuyama | H04N 1/52 358/3.13 |
| 2016/0196481 A1* | 7/2016 | Otani | B41J 2/475 358/3.17 |

* cited by examiner

PATTERN EXPANSION
MATRIX 701

|  | PATTERN 0 | PATTERN 1 | PATTERN 2 | PATTERN 3 |
|---|---|---|---|---|
| LEVEL 0 | ⊞ | ⊞ | ⊞ | ⊞ |
| LEVEL 1 | | | | |
| LEVEL 2 | | | | |
| LEVEL 3 | | | | |

FIG.11

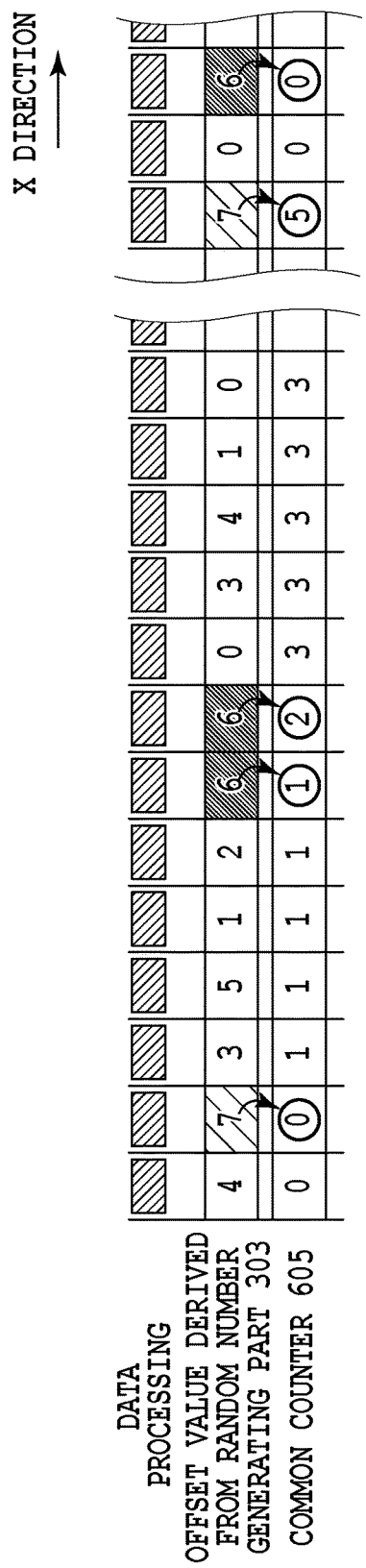

DATA PROCESSING APPARATUS AND PRINT DATA GENERATING METHOD DETERMINING A DOT ARRANGEMENT PATTERN USING A CODE TABLE

BACKGROUND OF THE INVENTION

Field of the Invention

The present invention relates to a data processing apparatus and a print data generating method, and in particular, to a technique for making an offset in an arrangement of a plurality of dot arrangement patterns used to binarize image data.

Description of the Related Art

In a dot arrange pattern, "printing (dots present)" or "non-printing (no dots)" is determined in each pixel of a unit of one pixel×two pixels which has a double resolution of 1,200 dpi in a longitudinal direction, according to a gradation value of image data. In binary data generation, gradation values indicated by image data of 600 dpi can be converted into binary data (dots present/no dots) within the range of one pixel×two pixels, using dot arrangement patterns corresponding to the gradation value indicated by the image data. This binarization technique enables data processing, transfer, and the like to be executed in a low-resolution data form, preventing the data processing and transfer from needing a very long time. A memory capacity needed for a printing apparatus may be reduced.

Japanese Patent Laid-Open No. 2014-031001 describes a configuration that uses, as a unit, a matrix in which a plurality of dot arrangement patterns corresponding to one gradation value indicated by image data is arranged in an X direction and a Y direction and repeatedly uses and applies the matrix to the image data for binarization, so that texture in the print image is reduced. Specifically, each time the matrix is repeatedly used, an offset process is executed in which the an offset value is differentiated with respect to the arrangement of codes in a code table that determine the arrangement of the dot arrangement pattern, thus changing the arrangement of the plurality of dot arrangement patterns in the matrix. This enables a reduction in regular texture in the print image when the matrix for one gradation value is repeatedly used for the pixel area.

The size, in each of the X and Y directions, of the matrix or the code table, which is the above-described unit repeatedly used, is typically represented as the power of 2 such as 4, 8, or 16. In this case, when, for example, the size in the X direction is 4 and each of the pixel numbers of 0 to 3 for making offset is selected at an equal probability, this is suitable for eliminating the above-described regular texture.

In contrast, the size, in each of the X and Y directions, of the matrix or the code table for the dot arrangement pattern may not be the power of 2. However, in determination of the offset value, for example, if the number represented by data bits that generate a random number is the power of 2, the offset value may be indivisible by the size of the code table. In this case, the frequencies of generation of a plurality of offset values corresponding to the code table may not be even. As a result, the frequencies at which the offset pixel numbers are selected are biased, possibly resulting in another texture problem with the print image.

SUMMARY OF THE INVENTION

An object of the present invention is to provide a data processing apparatus and a print data generating method that enable the frequencies of generation of offset values to be made uniform even when an offset value is indivisible by the size of a matrix or a code table for dot arrangement patterns.

In a first aspect of the present invention, there is provided a data processing apparatus comprising: a holding unit configured to hold a code table that arranges codes corresponding to an arrangement of a plurality of pixels that compose a image to be formed on a predetermined size of area of a print medium, from among a plurality of dot arrangement patterns each of which is used for specifying a dot arrangement for each of the plurality of pixels, each of the codes determining the dot arrangement pattern; a determining unit configured to determine one first offset value from a predetermined number of first offset values which is power of 2, each of the first offset values denoting a number of pixels by which an arrangement of the codes is shifted in the code table, for at least one of longitudinal and lateral directions of the arrangement of the plurality of pixels corresponding to the arrangement of codes; a table generating unit configured to, in a case where a number of pixels corresponding to a size of the code table in the at least one of the longitudinal and lateral directions is not power of 2 and the determining unit determines the first offset value wherein a quotient and a remainder when the predetermined number is divided by the number of pixels corresponding to the size that is not the power of 2 is 1 or more, determine a second offset value that is an offset value for the case of the quotient being zero, as substitute for the determined first offset value, and to generate the code table to which an offset is made with the second offset value in the at least one of the longitudinal and lateral directions; and a dot data generating unit configured to determine the dot arrangement pattern for each of the plurality of pixels by applying the code table to which the offset is made to multivalued data and to generate dot data for the image to be formed on the predetermined size of area.

In a second aspect of the present invention, there is provided a print data generating method comprising: a step of acquiring a code table that defines arrangements of codes corresponding to an arrangement of a plurality of pixels that compose a image to be formed on a predetermined size of area of a print medium, from among a plurality of dot arrangement patterns each of which is used for specifying a dot arrangement for each of the plurality of pixels, each of the codes determining the dot arrangement pattern; a step of determining one first offset value from a predetermined number of first offset values which is power of 2, each of the first offset values denoting a number of pixels by which an arrangement of the codes is shifted in the code table, for at least one of longitudinal and lateral directions of the arrangement of the plurality of pixels corresponding to the arrangement of codes; a step of, in a case where a number of pixels corresponding to a size of the code table in the at least one of the longitudinal and lateral directions is not power of 2 and the determining step determines the first offset value wherein a quotient and a remainder when the predetermined number is divided by the number of pixels corresponding to the size that is not the power of 2 is 1 or more, determining a second offset value that is an offset value for the case of the quotient being zero, as substitute for the determined first offset value, and generating the code table to which an offset is made with the second offset value in the at least one of the longitudinal and lateral directions; and a step of determining the dot arrangement pattern for each of the plurality of pixels by applying the code table to which the offset is made to multivalued data and generating dot data for the image to be formed on the predetermined size of area.

The above-described configuration enables the frequencies of generation of the offset values to be made uniform even when an offset value is indivisible by the size of a matrix or a code table for dot arrangement patterns.

Further features of the present invention will become apparent from the following description of exemplary embodiments (with reference to the attached drawings).

BRIEF DESCRIPTION OF THE DRAWINGS

FIG. 9A to FIG. 9C are diagrams illustrating an example of arrangement of a code table in a print medium observed when the code table is repeatedly used according to the first embodiment of the present invention;

FIG. 11 is a diagram showing a pattern expansion matrix that defines dot arrangement patterns at respective levels used for the binarization processing part of the present embodiment;

FIG. 13 is a diagram illustrating conversion of offset values in the X direction in an offset value generating part according to a third embodiment of the present invention.

DESCRIPTION OF THE EMBODIMENTS

Embodiments of the present invention will be described in detail with reference to Drawings.

By way of example, a printing apparatus using an ink jet printing scheme will be described below. However, application of the present invention is not limited to this. The present invention is also applicable to, for example, an electrophotographic printing apparatus using toner as a color material, as is apparent from the following description.

First Embodiment

Figure 1:
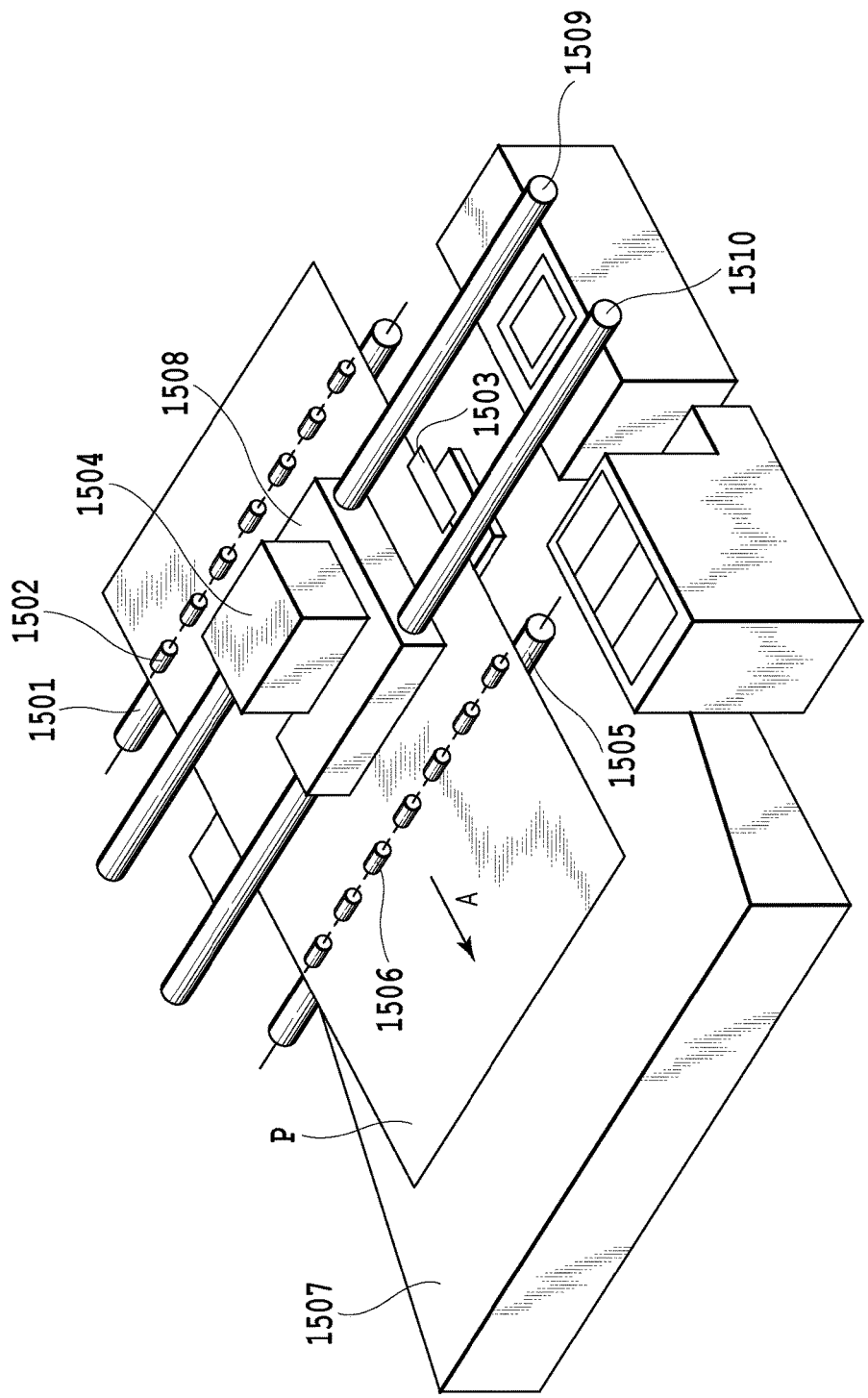
FIG. 1 is a perspective view showing a general configuration of an inkjet printing apparatus according to an embodiment of the present invention.

FIG. 1 is a perspective view showing a general configuration of an inkjet printing apparatus according to an embodiment of the present invention. A print medium P such as a sheet is sandwiched between a conveying roller 1501 and a pinch roller 1502 that follows the conveying roller 1501 while elastically biasing the print medium toward the conveying roller 1501. The print medium is conveyed in the direction of arrow A in FIG. 1 in conjunction with rotation of the conveying roller 1501 while being guided and supported by a platen 1503. The platen 1503 is provided in a print area opposite to a surface of a print head in which an ejection port is formed (ejection surface); the print head is mounted in a carrier 1508 to eject ink. The platen 1503 supports a back surface of the print medium P to keep a constant distance or a predetermined distance between a surface of the print medium P and the ejection surface. After being conveyed on the platen 1503 and printed, the print medium P is conveyed in an A direction while being sandwiched between a discharge roller 1505 and a spur 1506 that follows the discharge roller 1505. The print medium P is then discharged onto a sheet discharging tray 1507.

The carriage 1508 has the print head (not shown in the drawings) removably mounted thereon and an ink tank 1504 also removably mounted thereon in which ink to be supplied to the print head is stored. The printing apparatus of the present embodiment includes print heads for a yellow ink (Y), a magenta ink (M), a cyan ink (C), and a black ink (Bk), respectively. The ink tank 1504 has ink housing chambers in which the respective four colors are stored. The carriage 1508 can reciprocate along two guide rails 1509 and 1510 by being driven by a driving mechanism such as a motor not shown in the drawings. Printing can be performed by moving the carriage to scan the print head along the print medium P, and during the scan, ejecting the ink in accordance with the print data. This carriage moving direction intersects a print medium conveying direction (direction of arrow A) and is referred to as a main scan direction or a lateral direction. In contrast, the print medium conveying direction is referred to as a sub-scan direction or a vertical direction. The above-described scan of the print head and conveyance of the print medium P are alternately repeated to print the entire print medium P. An ink jet printing apparatus is a typical example of a printing apparatus to which the present invention can be applied.

Figure 2:
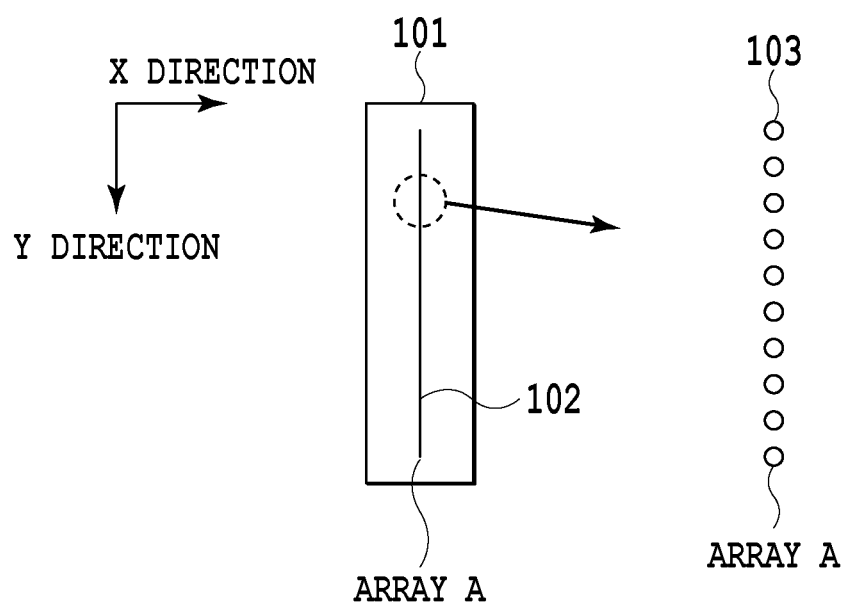
FIG. 2 is a diagram illustrating a print head used in the printing apparatus shown in FIG. 1.

FIG. 2 is a diagram illustrating a print head used in the printing apparatus shown in FIG. 1. In FIG. 2, an X direction is the above-described main scan direction, and a Y direction is the above-described sub-scan direction. A print head 101 for each color includes a nozzle array (array A in FIG. 2) 102 serving as print elements. Each nozzle array 102 includes a plurality of nozzles 103 arranged in the Y direction when the print head is installed in the printing apparatus for use. An ink channel communicating with each of the nozzles 103 is provided with an electrothermal conversion element that generates heat to cause ink to be ejected. The configuration using the electrothermal conversion element is illustrated as an example of the ink jet printing scheme. However, the present invention is not limited to this configuration. A print head configured in a different manner may be used, for example, configuration using a piezo element, an electrostatic element, or a MEMS element.

Figure 3A:
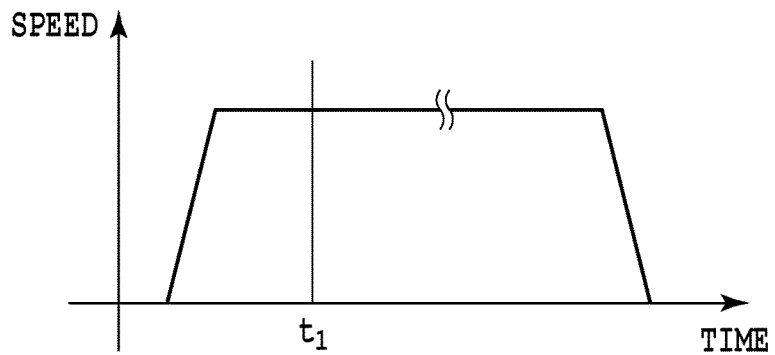
FIG. 3A and FIG. 3B are diagrams illustrating a printing operation performed in conjunction with movement of the print head in a main scan direction in the printing apparatus shown in FIG. 1.
Figure 3B:
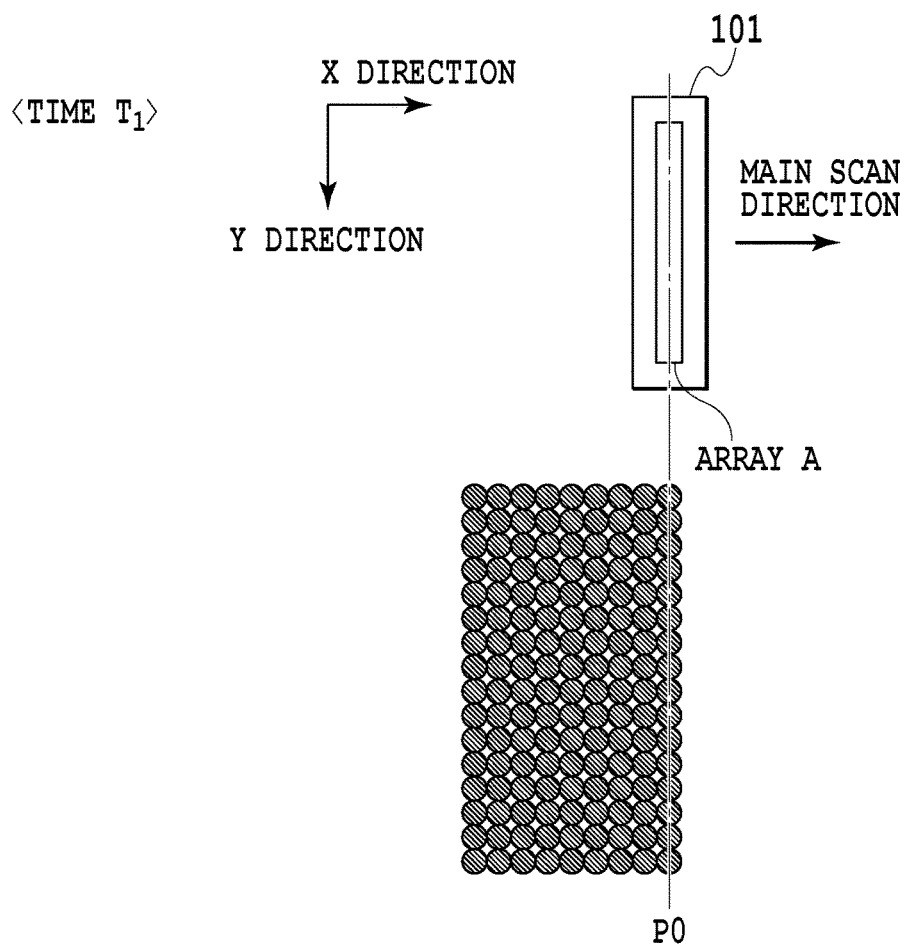

FIG. 3A is diagram illustrating a printing operation performed in conjunction with movement (scan) in the main scan direction (X direction) of the print head in the printing apparatus shown in FIG. 1 and shows the printing operation performed by the print head for one color. As shown in FIG. 3A, one scan of the print head includes an acceleration period, a constant-speed period, and a deceleration period. The ink is ejected from the nozzles in the moving print head during the constant-speed period in accordance with the print data. Depending on printing control, control may be performed to eject the ink even during the acceleration period or the deceleration period for printing. At time t1 during scan of the print head, the ink is ejected from the nozzles in the print head to form ink dots on the print medium. For print data involving ejection of the ink from all the nozzles, a dot array PO is formed and forms a part of an image together with dot arrays formed by time t1 as shown in FIG. 3B. The dot arrays shown in FIG. 3B illustrate print data for printing of what is called a solid image. Of course, the arrangement of dots formed varies according to the printed image.

Figure 4:
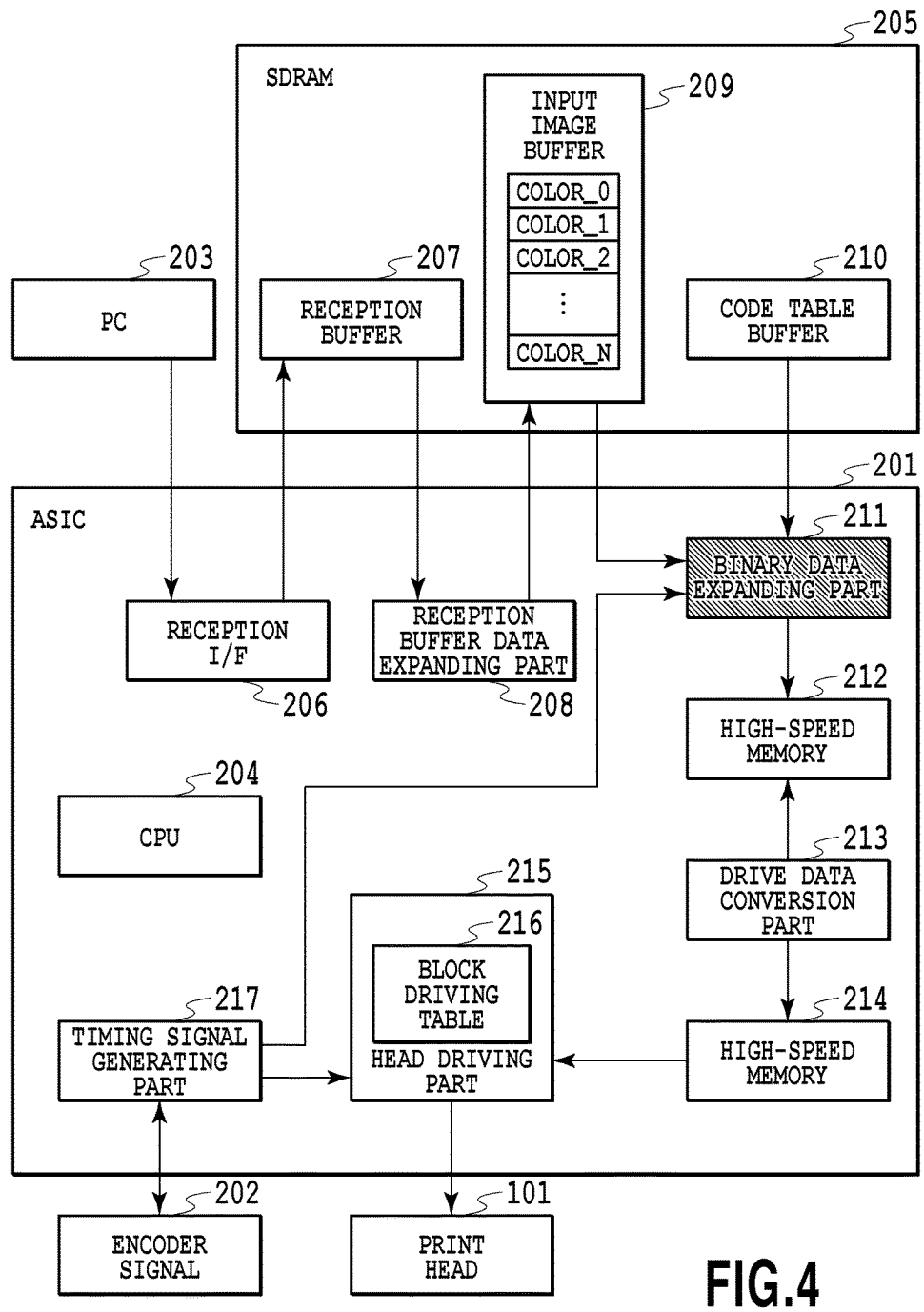
FIG. 4 is a block diagram mainly showing a data processing configuration in the printing apparatus of the embodiment of the present invention.

FIG. 4 is a block diagram mainly showing a data processing configuration in the printing apparatus of the present embodiment described above. Specifically, FIG. 4 shows components of an ASIC 201 and an SD-RAM 205 included in control circuits in the printing apparatus of the present embodiment. FIG. 4 shows, in addition to the ASIC 201, an encoder signal 202, a personal computer (PC 203) serving as a host apparatus, and the print head 10.

The encoder signal 202 is a signal indicative of the position of the print head 101 in the main scan direction and is used to generate a timing signal for data generation and a timing signal for data transfer to the print head 101. The PC 203 is a host apparatus for the printing apparatus and transfers data on an image to be printed to a data receiving part of the ASIC 201 in the printing apparatus, with the data stored in a reception buffer 207 in the SD-RAM 205. Based on the stored image data, the ASIC 201 generates data used to control the print head 101, that is, print data and a heat pulse signal.

For the ASIC 201, the CPU 204 integrates and manages general operations of the ASIC. The reception I/F 206 is an interface part that receives data transferred from the PC 203. For example, the reception I/F 206 loads a signal in accordance with an interface protocol such as USB or IEEE1394 and generates data in a form that can be easily handled by the ASIC (normally the data is often shaped into byte units) to store the data in the reception buffer 207 in the SD-RAM 205. The data stored in the reception buffer 207 undergoes command analysis by the CPU 204 and is expanded into an input image buffer 209 using a reception buffer data expanding part 208 for each color.

The data saved in the input image buffer 209 is read at a predetermined timing for print control by a binary data expanding part 211. At this time, the binary data expanding part 211 reads a code table stored in (held by) a code table buffer 210, expands the input image data using the code table into binary data as described below with reference to FIG. 7 and the subsequent figures, and stores the resultant data in a high-speed memory 212. At this time, the binary data expanding part 211 executes data processing such as data mask control or thinning control as needed for control, according to a print mode. The code table buffer 210 may configured in the SD-RAM 205. However, when, for example, the code table size is small, the code table may be stored inside the ASIC. A drive data conversion part 213 reads the image data from the data storage high-speed memory 212 in which image data for each nozzle array is stored and converts the image data into a form of data which a head driving part 215 reads efficiently, and stores the resultant data in a high-speed memory 214. Instead of the high-speed memories 212 and 214, a low-speed memory may hold data using a wide bus based on a multi-item system. Alternatively, a storage device externally attached to the ASIC may be used if a sufficient time to read data may be provided. The head driving part 215 reads data stored in high-speed memory 214 for the print image data storage and performs driving control on the print head such as transfer of print image data to the print head 101 and transmission of a heat pulse signal to the print head 101 in accordance with order of driving set in a block driving table 216. A timing signal generating part 217 generates various print timings based on signals from the encoder signal 202. Instead of the SD-RAM 205, a memory such as a D-RAM or an S-RAM may be used which is classified into RAM.

Figure 5:
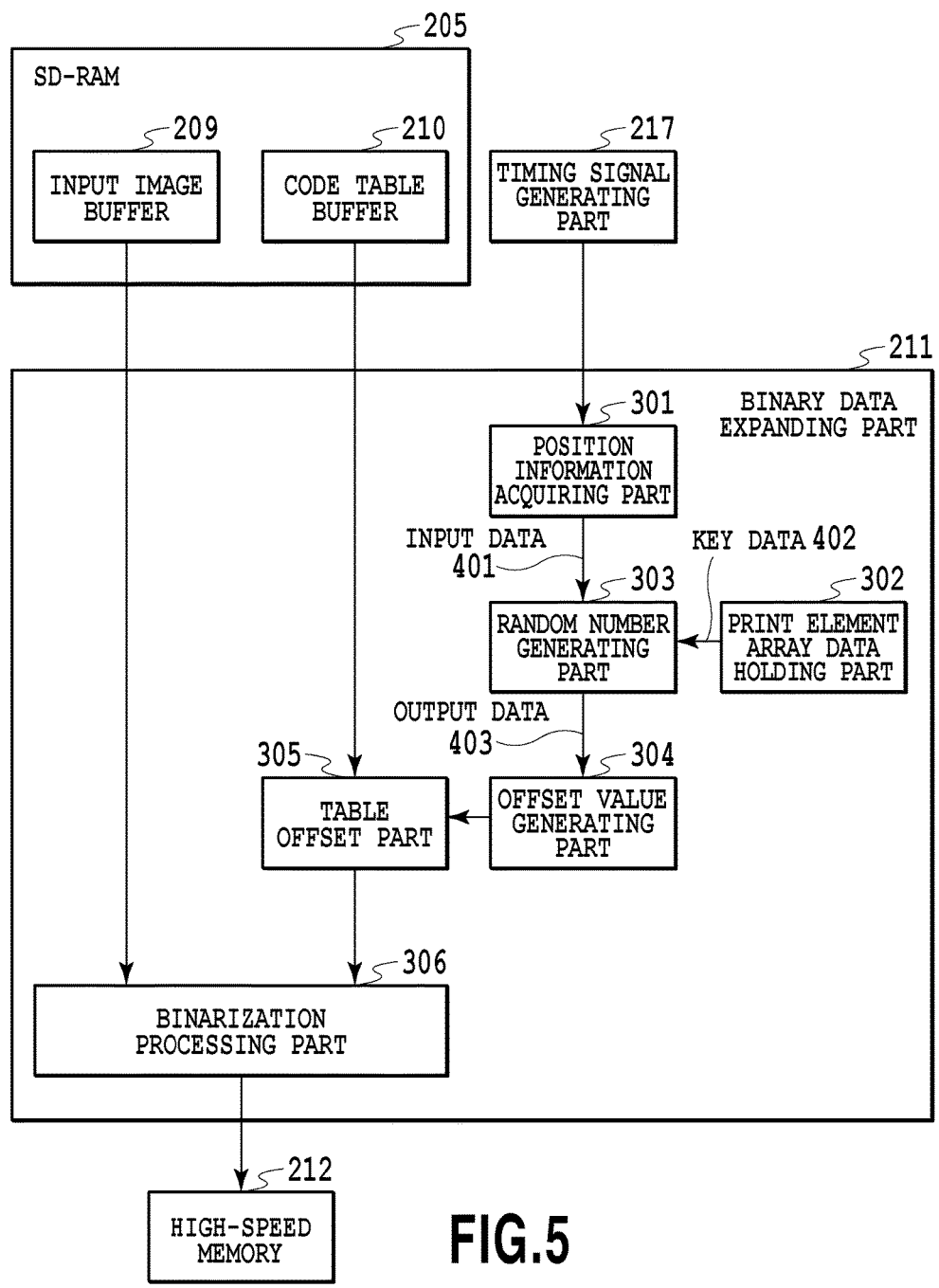
FIG. 5 is a block diagram showing a detailed configuration of a binary data expanding part shown in FIG. 4.

FIG. 5 is a block diagram showing a detailed configuration of the binary data expanding part 211 shown in FIG. 4. In FIG. 5, a position information acquiring part 301 acquires information on a pixel position X, Y on a print medium. The position information acquiring part 301 is configured to receive initial values for the position X, Y to update position information. However, if data is expanded from the same position, the initial values may be fixed. For example, during printing in the main scan direction, the position information is updated by receiving a data generation signal from the timing signal generating part 217 and adding the number of data generations in the main scan direction to the initial value for X. If, during bidirectional printing, scan is being performed in the direction opposite to the main scan direction, subtraction is performed on the initial value for X. Similarly, if processing is executed in the sub-scan direction with the position changed, addition is performed on the initial value for Y. The position information acquiring part 301 may be configured to, even when not internally holding position information, acquire position information from a memory inside the ASIC or an SD-RAM outside the ASIC provided that position information data is stored in the storage device. A print element array data holding part 302 holds print element array specific data to be input to a random number generating part 303.

The random number generating part 303 generates a random number using the position information obtained by the position information acquiring part 301 and the print element array specific data held by the print element array data holding part 302, as described in detail with reference to FIG. 6. The random number is desirably uniquely determined for input position information X, Y. Thus, even when a serial printing apparatus like the present apparatus executes a non-reproducible binarization process, the process can be used along with a multipass printing process. An offset value generating part 304 uses the random number generated by the random number generating part 303 to generate an offset value applied to the code table, as described in detail with reference to FIG. 7. Then, a table offset part 305 uses the offset value generated by the offset value generating part 304 to execute an offset process on the codes in the code table. A binarization processing part 306 refers to the code table on which the table offset part 305 has executed the offset process, and executes a binarization process on the input image data and stores the resultant binary data in the high-speed memory 212.

Figure 6:
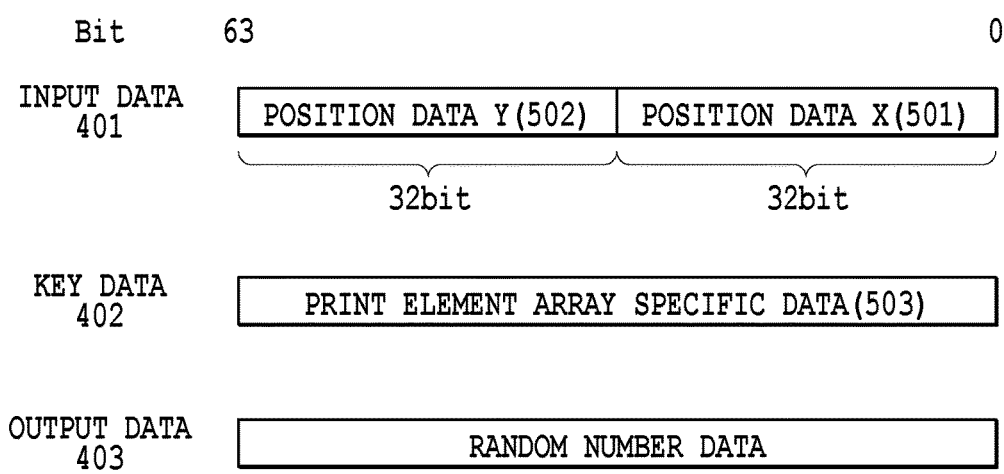
FIG. 6 is a diagram showing the structure of data input to and output from a random number generating part shown in FIG. 5.

FIG. 6 is a diagram showing the structure of data input to and output from the random number generating part 303 shown in FIG. 5. As shown in FIG. 6, two data, Input Data 401 and KeyData 402, are input to the random number generating part 303, which outputs OutputData 403. InputData 401 has 32-bit position data X501 in the X direction and 32-bit position data Y502 in the Y direction. That is, the position information acquiring part 301 outputs respectively 32-bit position data X and Y, which are used by the random number generating part 303 to generate a random number as described below. The 32 bits, which represent the data X and Y respectively, correspond to a bit width that allows, for example, a position on an A4-sized print medium to be uniquely represented. Thus, an offset value generated based on a generated random number is uniquely determined with respect to a pixel position on the print medium. In other words, the offset values are associated with one another and distributed all over the print medium. As a result, even repeated use of a code table with a predetermined size is equivalent to pseudo use of a code table with a print medium size.

The KeyData 402 is stored in the print element array data holding part 302 for each nozzle array in the print head as print element array specific data 503. A specific parameter for each nozzle array, that is, for each ink color allows the offset value to be uniquely determined with respect to the ink color or the level of multivalued data. As a result, for example, varying the offset value according to the ink color enables, for example, printing of an image with desired image quality. In contrast, for example, when a combination of inks ejected onto the print medium is to be controlled with the same offset value used for the four ink colors, specific values for the respective ink colors may be the same. In the above description, the KeyData 402 is held inside the ASIC by way of example. However, the print head may be provided with a nonvolatile memory to hold the KeyData 402 as information specific to the nozzle array, or the SD-RAM or the ASIC may hold a SRAM in which the KeyData 402 is stored as a rewritable parameter.

The random number generating part 303 receives the above-described InputData 401 and KeyData 402 to repeat change of arrangement of bits of the data and calculation of exclusive OR approximately 10 times and outputs Output Data 403 of 64-bit random number data. The random number generating part 303 is not limited to an arithmetic circuit based on exclusive OR but may be configured to use four arithmetic operations.

Now, the offset value generating part 304 will be described in detail. The offset value generating part 304 in the present embodiment generates offset values for a code table with a size of 6 pixels×6 pixels shown in FIG. 9A. More specifically, lower 3 bits of a random number generated by the random number generating part 303 are determined to be an offset value in the X direction, and upper 3 bits of the random number is determined to be an offset value in the Y direction. In this case, when the pixel number in each of the X and Y directions is not the power of 2 as a size of 6 pixels×6 pixels in the present embodiment, offset values are not evenly generated. The reason is as follows. The lower 3 bits of a random number generated by the random number generating part 303 are the offset value in the X direction, but when 6 or 7 is generated as the offset value, this offset value exceeds the size of the code table. Thus, the offset value of 6 becomes to be equal to the offset value of 0, and the offset value of 7 becomes to be equal to the offset value of 1. That is, the offset values of 0 and 1 involve a higher frequency of generation of the code table of that offset value than the offset values of 2 to 5. Thus, in the present embodiment, when a code table with a size of 6 pixels×6 pixels is used, if the offset value obtained from the random number generating part 303 is 6 or 7, this offset value (first offset value) is converted into an offset value (second offset value) smaller than the code table size according to the pixel position in the X direction, and the resultant value is used as an offset value.

Figure 7:
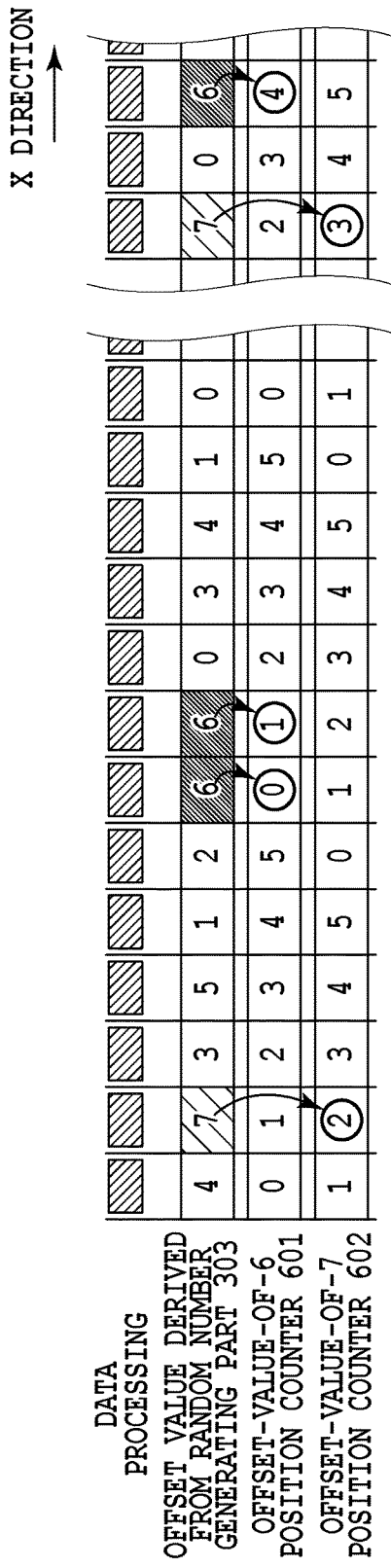
FIG. 7 is a diagram illustrating conversion of generated offset values according to a first embodiment of the present invention.

FIG. 7 is a diagram illustrating conversion of an offset value in the X direction. The random number generating part 303 generates a 64-bit random number as described with reference to FIG. 6, and the lower 3 bits of the random number is derived as the offset value in the X direction. As shown in FIG. 7, the derived offset value is one of the values of 0 to 7. In connection with this, the offset value generating part 304 includes a position counter 601 for an offset value of 6 and a position counter 602 for an offset value of 7. The counters 601 and 602 increment from 0 to 5 each time the position information for the X direction shifts and return to 0 when the counters count up to 5. In the illustrated example, the offset-value-of-6 position counter 601 has an initial value of 0, and the offset-value-of-7 position counter 602 has an initial value of 1. When the offset value derived from the random number generating part 303 is 6, the current counter value in the offset-value-of-6 position counter 601 is determined to be the offset value. Similarly, when the offset value derived from the random number generating part 303 is 7, the current counter value in the offset-value-of-7 position counter 602 is determined to be the offset value. In this manner, in the present embodiment, when the offset value derived from the random number generating part 303 is 6 or 7, conversion is performed such that the count value in the corresponding counter is determined to be the offset value. For the Y direction, a similar configuration is used to convert the offset value.

Figures 9A, 9B, 9C:
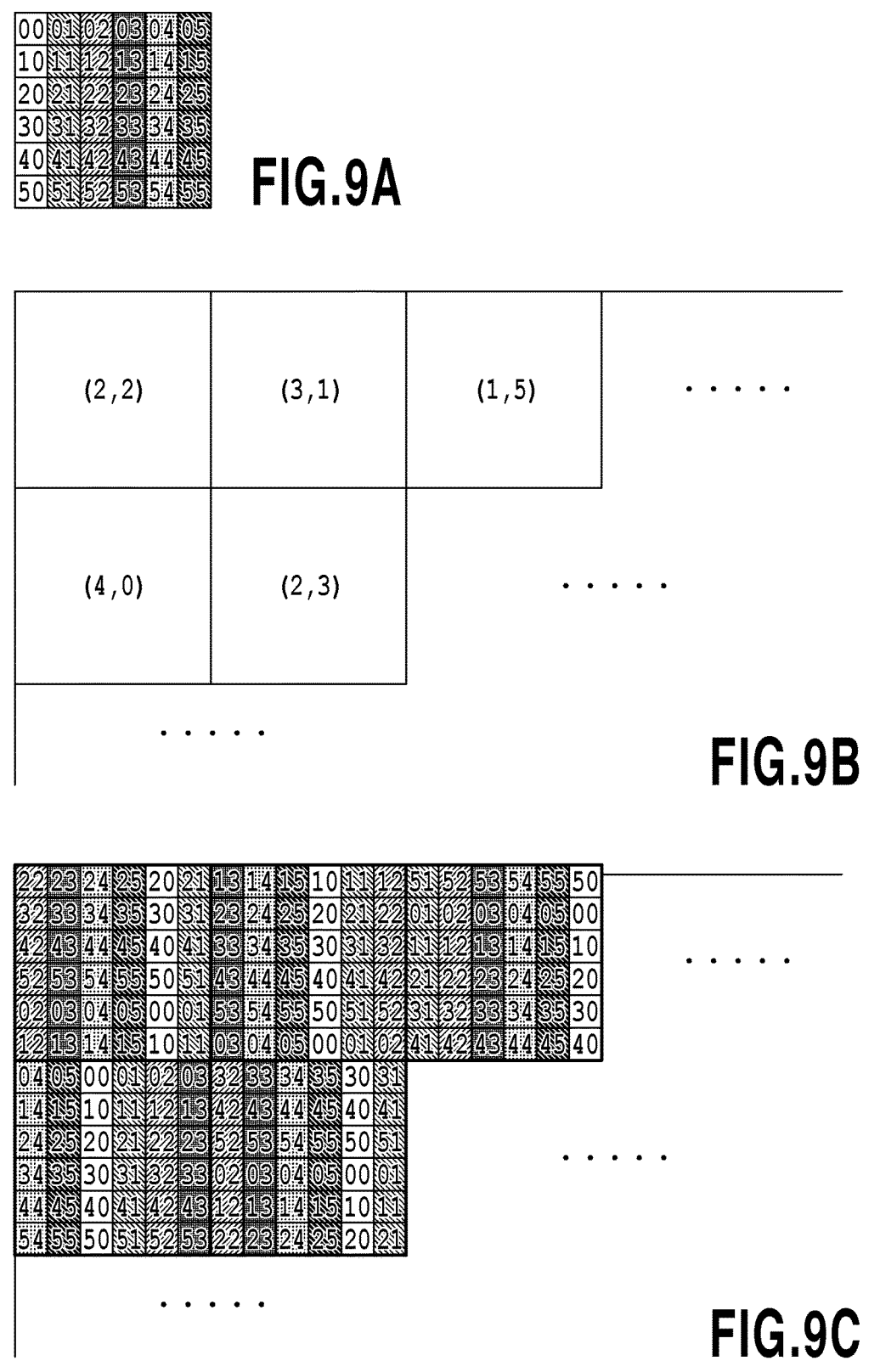

Thus, for the code table with the predetermined size of 6 pixels×6 pixels shown in FIG. 9A, offset values of 0 to 5 may be generated, and the frequencies of generation of the offset values may be uniform. This conversion of the offset values allows different offset values to be generated according to the shifted position at least within the range of the count values of 0 to 5. More specifically, for the direction in which the size of the arrangement of a plurality of pixels in the code table in the X or Y direction is not the power of 2, the offset value generating part 304 generates an offset value that makes an offset to the arrangement of the corresponding code in the code table and that has a period of the power of 2. Furthermore, the offset value generating part 304 converts the offset value that has a quotient and a remainder of 1 or more when the period of the power of 2 is divided by a size that is not the power of 2 into an offset value with the quotient of 0. In other words, the offset value generating part 304 includes the counters, which increment each time the position in the direction in which the size in the X or Y direction is not the power of 2 is shifted, and return the counter value to the initial value when the value of the size is not the power of 2. Then, the offset value generating part 304 converts the offset value that has a quotient and a remainder of 1 or more when the period of the power of 2 is divided by a size that is not the power of 2 into a counter value corresponding to the position of the offset value.

The above-described embodiment is an example, and other example may be used as long as the configuration performs conversion based on the position information. Counter values for Y direction offset values of 6 and 7 may be used by adding two counters that count along the Y direction.

In the present embodiment, the example of the code table with a size of 6 pixels×6 pixels has been described. However, the application of the present invention is not limited to the code table with a size of 6 pixels×6 pixels. For example, it is possible to use a combination of tables with a size of the number of pixels that is not the power of 2×the number of pixels that is the power of 2 such as 6×8, or a code table with a size of 6×7. Moreover, for the size of the code table, tables with different sizes for the respective colors may be held and used, for example, a code table with a size of 6 (X direction)×8 (Y direction) pixels is used for one color, and a code table with a size of 8×8 pixels is used for another color. Of course, the same code table may be used for all the colors, but when the same code table size is used for all the colors and the same offset values are used for each position, the code table with the same code arrangement is used for all the colors. With a large number of colors, the same dot patterns in multiple colors may overlap. To provide for such a case, different code table sizes are used for the respective colors. This suppresses generation of the same boundaries between tables in conjunction with switching of patterns, hindering the boundary between the tables in the print image from being viewed. Furthermore, texture may be visually reduced. In this case, for a certain color, one or both of the sizes of the code table in the X and Y directions may be the power of 2, but since the size of the code table varies according to the color, the boundary between the tables is unlikely to be viewed as described above. At this time, for example, sizes of 8 pixels×8 pixels and 6 pixels×8 pixels are set for cyan and magenta, respectively, which are included in the key colors of cyan, magenta, yellow, and black, such that the colors with high use frequencies avoid having the same period, thus further enhancing the above-described effect.

Furthermore, when one of the sizes of the code table in the X and Y directions is the power of 2 and the other size is not the power of 2, the above-described random number generating part of the present embodiment may be used in common for both sizes. Thus, the configuration of hardware and the like can be simplified.

Moreover, the size of, for example, a dither matrix, which is used for quantization, is typically the power of 2, and in this case, code tables for some ink colors may have the same size of the power of 2.

When the size of the code table is not the power of 2 in the above-described modifications, the above-described embodiment of the present invention may be applied to make the frequencies of generation of the offset values uniform.

Figure 8A:
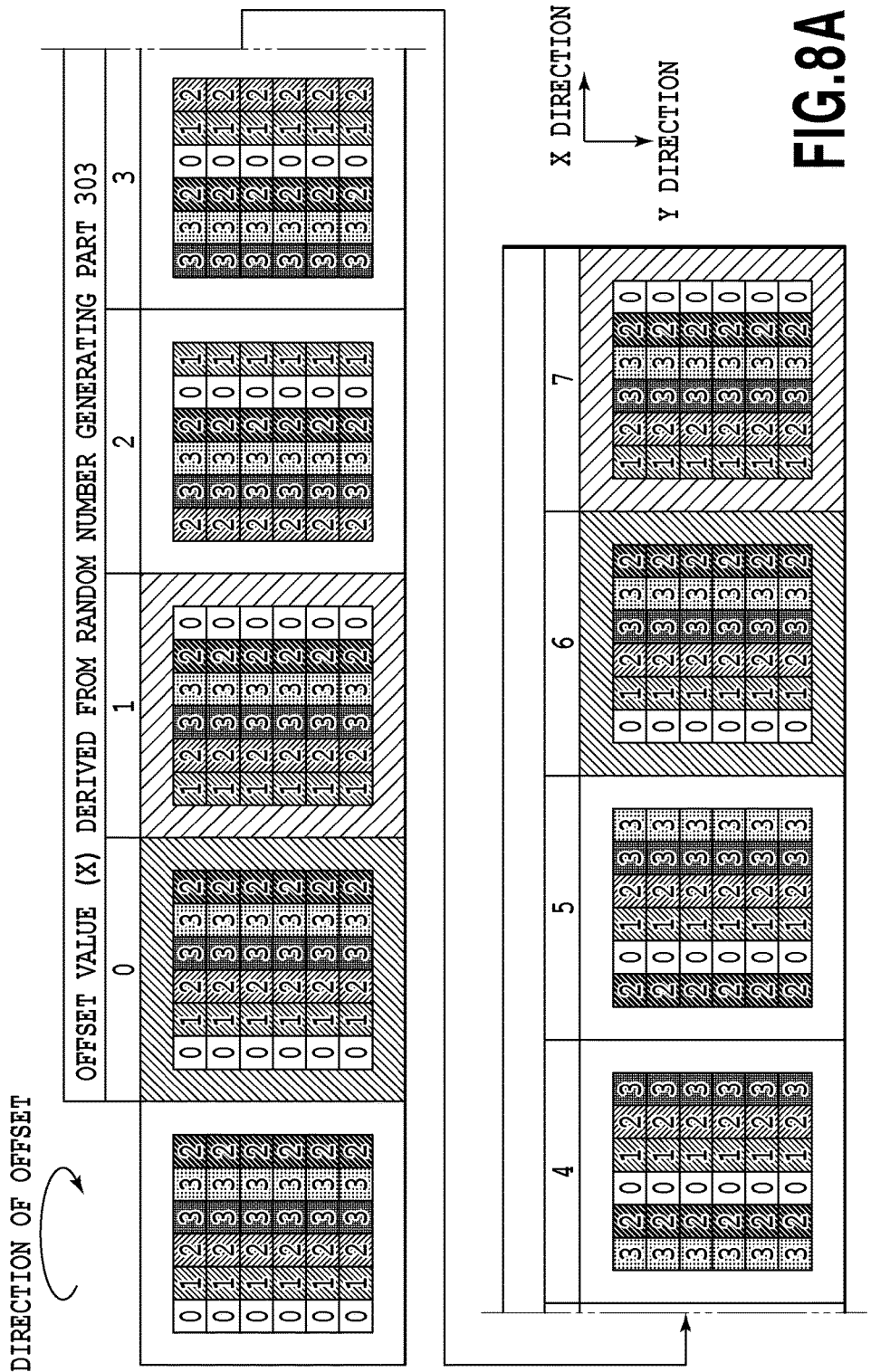
FIG. 8A and FIG. 8B are diagrams illustrating an offset operation of a table offset part 305 using offset values.
Figure 8B:
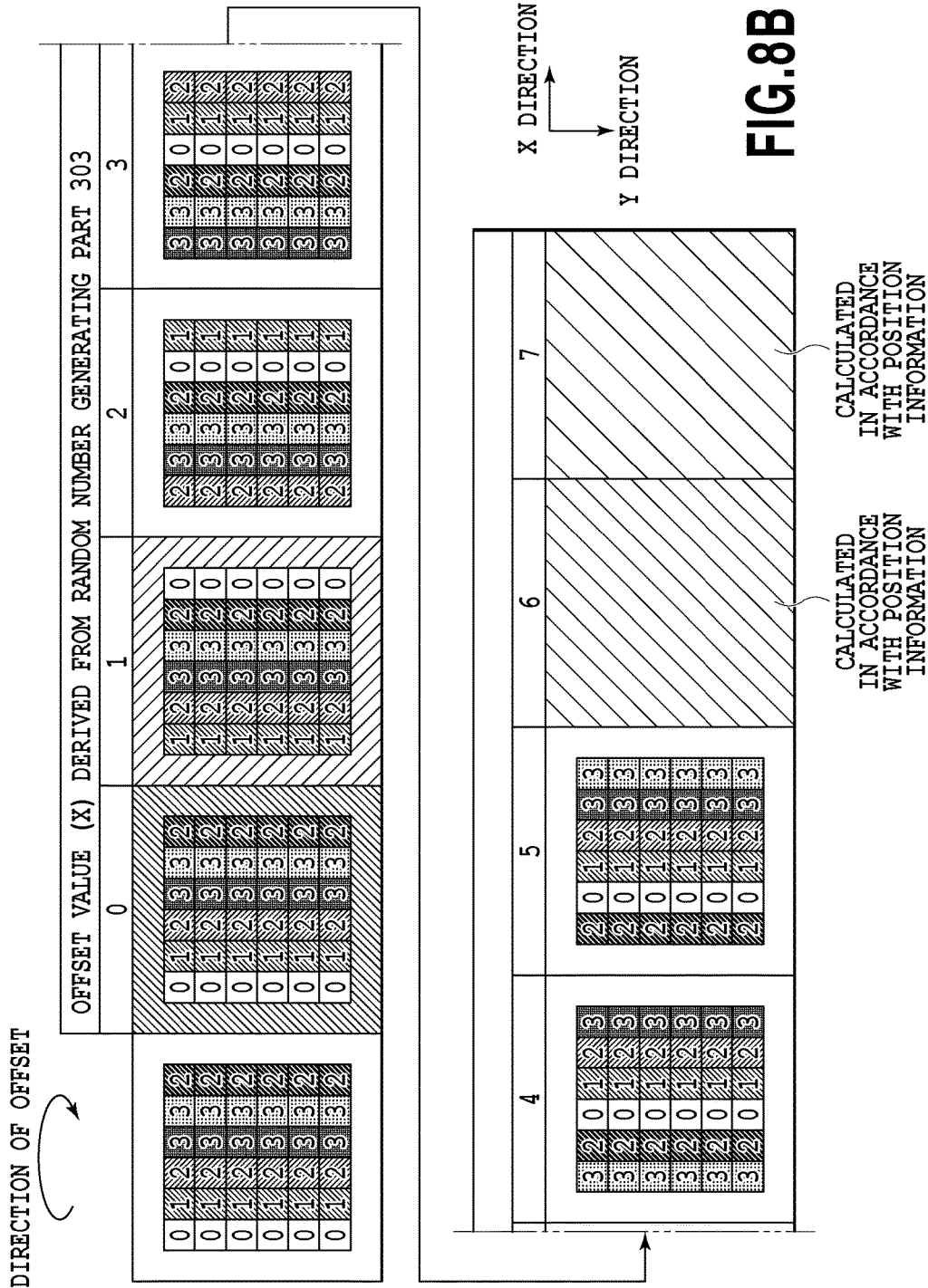

FIG. 8A and FIG. 8B are diagrams illustrating an offset operation of the table offset part 305 using offset values obtained as described above. Specifically, FIG. 8A illustrates an offset operation in the X direction of a code table with a size of 6 pixels×6 pixels in which the present invention is not applied. FIG. 8B illustrates an offset operation in the X direction for the same code table according to the present embodiment.

As illustrated in FIG. 8A, when the values (lower 3 bits) obtained from the random number generating part 303 are used without any change, since the offset values of 6 and 7 are equal to the offset values of 0 and 1, respectively, the frequencies of generation of the code tables for the offset values of 0 and 1 increase. In contrast, in the embodiment of the present invention, the offset values of 6 and 7 obtained from the random number generating part 303 are each converted into any of the offset values of 0 to 5 according to the position information as shown in FIG. 8B. Thus, the offset values can be output to the print medium with the appropriate size at even frequencies.

FIG. 9A to FIG. 9C are diagrams illustrating examples of arrangement of code tables for the print medium in a case where a code table with a size of 6 pixels×6 pixels is repeatedly used according to the present embodiment.

FIG. 9A shows a code table with a size of 6 pixels×6 pixels. In FIG. 9A, "00", "01", . . . , "10", "11", . . . denote code and identify dot arrangement patterns for respective levels described below with reference to FIG. 11. In the present embodiment, during binarization, first, multivalued image data with 256 values are quantized to four levels of 0 to 3. Then, for each of the four levels, a code table is referenced according to a position in the print medium to obtain binary data in a pattern of 2 pixels×2 pixels identified by the code. In the code table shown in FIG. 9A, the code is sifted using the offset value corresponding to the pixel position in the print medium in the X and Y directions shown in FIG. 9B. More specifically, the offset in which the code is shifted is performed in a unit of pixel in each of X and Y directions of pixel arrangement on the print medium. FIG. 9B shows offset values according to the present embodiment. As described above, when "6" or "7" appears in the offset values output from the random number generating part 303, it is converted into any of the offset values of 0 to 5. FIG. 9C illustrates an example where the offset values are applied to the code table shown in FIG. 9A for the respective positions on the print medium as shown in FIG. 9B. As shown in FIG. 9C, even when the code table is small and the size of the code table is not the power of 2, the code table can be arranged on the print medium with regularity reduced.

Figure 10:
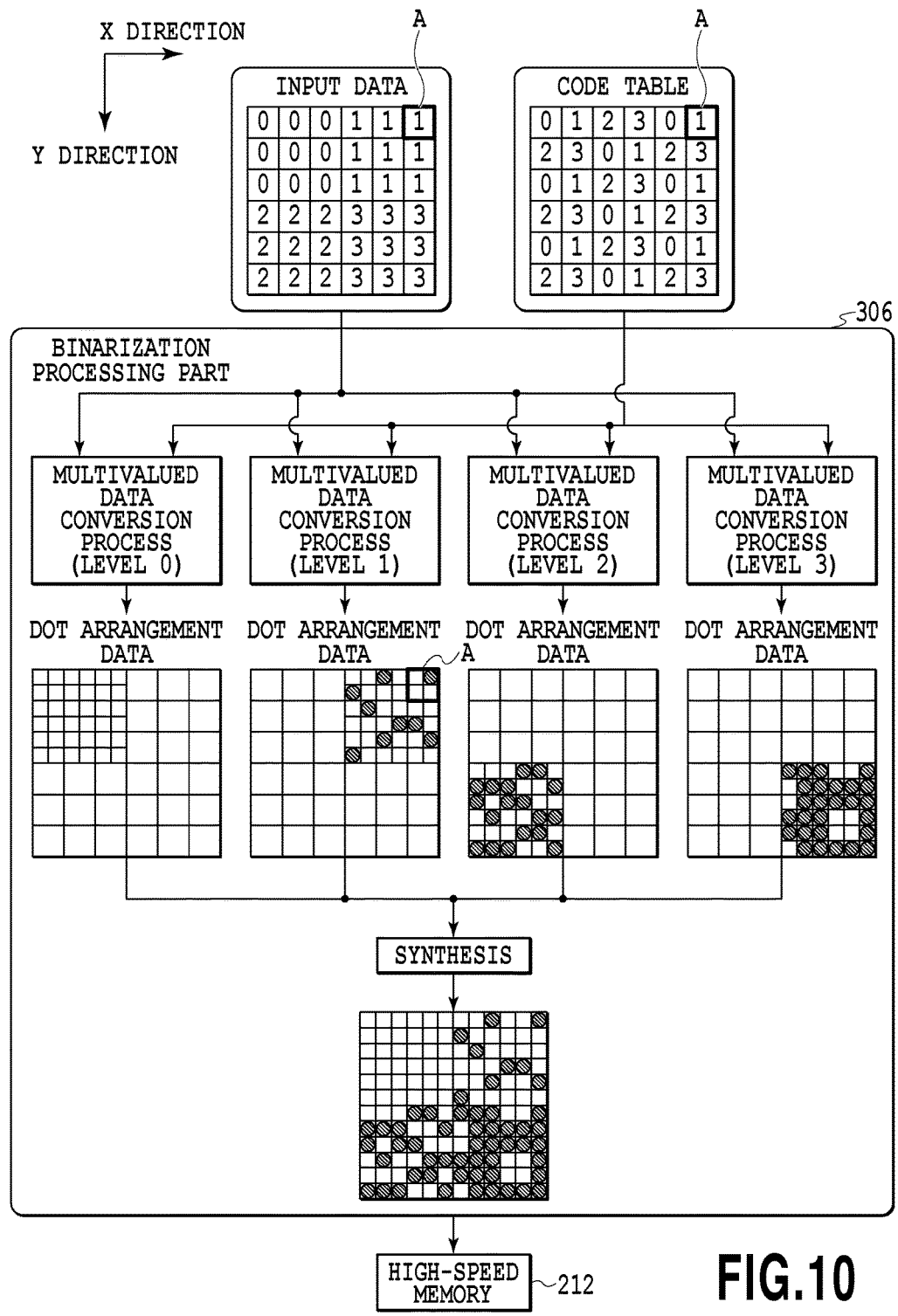
FIG. 10 is a diagram illustrating a binarization process executed by a binarization processing part in the embodiment of the present invention.

When the offset values are determined for the code table as described above, then the binarization processing part 306 executes a binarization process. FIG. 10 illustrates a binarization process executed by the binarization processing part 306 in the present embodiment. In FIG. 10, input data resulting from quantization of image data with 256 values has four level values of 0 to 3, and processing is executed in units of a total of 36 pixels corresponding to 6 pixels in the X direction and 6 pixels in the Y direction, for illustration and simplification of description. The codes in the code table are not the code like "00" and "01" shown in FIG. 9A but are indicative of the numbers of dot arrangement patterns associated with the respective codes as described below with reference to FIG. 11.

In FIG. 10, the input data is data stored in the input image buffer 209. The code table is table data on which the offset process has been executed by the table offset part 305. In the present embodiment, the same code table data is used regardless of the level of the input data. However, different code tables may be used for the respective levels of input data or for the respective nozzle arrays. The binarization processing part 306 references a pattern number that is a code in the code table for each of the levels 0 to 3 of input data and executes a multivalued data conversion process. That is, the dot arrangement pattern corresponding to the pattern number in the code table is selected and converted into binary dot arrangement data for the corresponding position.

FIG. 11 is a diagram showing a pattern expansion matrix that is used by the binarization processing part 306 of the present embodiment and that specifies dot arrangement patterns for the respective levels. A pattern expansion matrix 701 is stored in the binary data expanding part 211. The pattern expansion matrix 701 specifies four types of dot arrangement patterns for the respective four levels 0 to 3 of input data as shown in FIG. 11. In the dot arrangement pattern, a pattern of 2 pixels×2 pixels corresponds to one pixel of input data (code table). This conversion results in a double resolution in each of the X and Y directions. In each of the four types of dot arrangement patterns, a pattern number is associated with each level. Each pattern number corresponds to a code in the code table. Consequently, the code in the code table allows determination of which type of dot arrangement pattern is to be used.

As seen in FIG. 10 again, when the multivalued data conversion process with the pattern number in the code table referenced is executed, one pixel in the input data is converted into a pattern of 2 pixels×2 pixels in which dots are arranged. For example, a pixel A in the input data has input data at a level 1. The pixel A in the code table corresponding to this pixel uses "1" as a code after offsetting, that is, a "pattern 1" in the pattern expansion matrix 701. Thus, execution of the multivalued data conversion process places binary data (dots) of the "pattern 1" in the level 1, at the pixel A of 2 pixels×2 pixels in the dot arrangement data.

The thus generated dot arrangement data at each level is synthesized into binary data with a double resolution in each of the X and Y directions, which is stored in the high-speed memory 212.

As described above, the present embodiment allows the frequencies of generation of offset values to be made uniform even when the size of the code table for the dot arrangement pattern is not the power of 2. As a result, for example, in a print image in a printing apparatus using four color materials in yellow, magenta, cyan, and black, possible texture with a period of a multiple of 4 can be prevented. Furthermore, in connection with the size of, for example, a dither matrix, which is used for quantization, it is possible to prevent texture from being generated at a period of the common multiple of the repetition period of the code table and the repetition period of the dither matrix.

Even when a relatively small code table is used, the offset values in the code table are determined using random number values derived from the random number generating part using the position information in each of the X and Y directions. This is equivalent to pseudo use of a code table for the print medium size regardless of the size of code table. In addition, since the offset values are generated using the random numbers, the positions of the offset values with respect to the entire print medium are non-periodic and are appropriately distributed.

Second Embodiment

Figure 12:
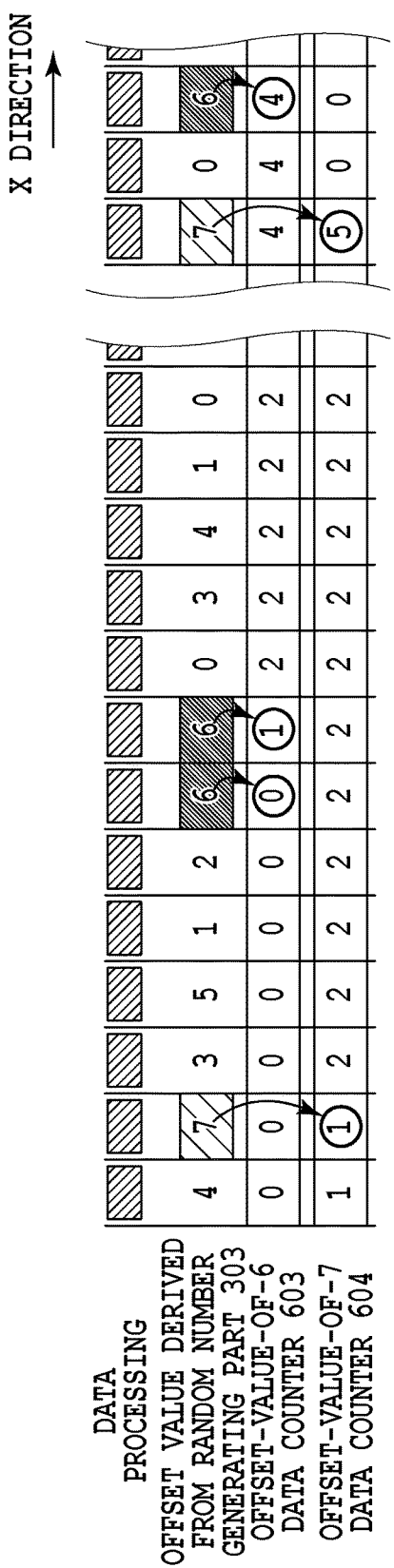
FIG. 12 is a diagram illustrating conversion of offset values in an X direction in an offset value generating part according to a second embodiment of the present invention.

FIG. 12 is a diagram illustrating conversion of offset values in the X direction in the offset value generating part 304 according to a second embodiment of the present invention. FIG. 12 is similar to FIG. 7 according to the first embodiment. In conversion of offset values, the offset value generating part 304 (FIG. 5) may use the number of generations for each offset value that exceeds the code table size. In FIG. 12, a data counter 603 for an offset value of 6 has an initial value of 0, and a data counter 604 for an offset value of 7 has an initial value of 1. For each offset value of 6 derived from the random number generating part 303, the data counter 603 converts the offset value of 6 into the current count value and increments the count value. The count value returns to 0 when the data counter 603 counts up to a value (5) corresponding to the table size. This also applies to a data counter 604 for an offset value of 7. Consequently, also in the present embodiment, the offset value derived from the random number generating part 303 is 6 or 7, conversion is performed to set the value counted by the corresponding counter to be the offset value. A similar configuration is used to convert the offset value for the Y direction. Thus, offset values of 0 to 5 are generated for a code table with a size of 6 pixels×6 pixels to allow the frequencies of generation of the offset values to be made uniform. This conversion of the offset values allows conversion into different offset values according to the positions of generation at least within the range of the number of times that the offset value of 6 or 7 is obtained from the random number (six times). That is, the offset value generating part 304 includes the counters, which increment at a position next to the position where the offset value is converted, and return the counter value to the initial value when the counter value is the value of the size that is not the power of 2. Then, the offset value that has a quotient and a remainder of 1 or more when the period of the power of 2 is divided by a size that is not the power of 2 is converted into a counter value corresponding to the position of the offset value.

Bidirectoinal printing using the above-described configuration of the present embodiment needs a configuration allowing initial values to be input and a configuration allowing holding of information indicating which of the offset values was used last. This is because, for bidirectional printing, scan is performed in the X direction and in the direction opposite to the X direction, making reproduction of the offset values difficult to achieve as in the case of multi-pass printing.

Third Embodiment

FIG. 13 is a diagram illustrating conversion of offset values in the X direction by the offset value generating part 304 according to a third embodiment of the present invention. FIG. 13 is similar to FIG. 7 according to the first embodiment. The offset value generating part 304 (FIG. 5) includes a common counter 605 that counts up when the offset value acquired from the random number generating part 303 is 6 or 7. An initial value can be set for the common counter 605, and in the illustrated example, an initial value of 0 is set. For each offset value of 6 derived from the random number generating part 303, the common counter 605 converts the offset value of 6 into the current count value and increments the count value. The count value returns to 0 when the common counter 605 counts up to a value (5) corresponding to the table size. A similar configuration is used to convert the offset value for the Y direction. Thus, offset values of 0 to 5 are generated for a code table with a size of 6 pixels×6 pixels to allow the frequencies of generation of the offset values to be made uniform. This conversion of the offset values allows conversion into different offset values according to the positions of generation at least within the range of the number of times that the offset value of 6 or 7 is obtained from the random number (six times).

Bidirectional printing using the above-described configuration of the present embodiment needs a configuration allowing initial values to be input and a configuration allowing holding of information indicating which of the offset values was used last. This is because, for bidirectional printing, scan is performed in the X direction and in the direction opposite to the X direction, making reproduction of the offset values difficult to achieve as in the case of multi-pass printing.

Other Embodiment

In the above-described embodiments, in the printing apparatus, the binary data expanding part 211 executes processing to convert multivalued image data into binary data. However, the application of the present invention is not limited to this form. For example, the above-described binary data expanding process may be executed in the host apparatus such as a PC. An apparatus such as the printing apparatus or the host apparatus therefor provides a data processing apparatus or a print data generating apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-178078, filed Sep. 2, 2014, and No. 2015-110573, filed May 29, 2015, which are hereby incorporated by reference wherein in their entirety.

What is claimed is:

1. A data processing apparatus comprising:
a processor and a memory storing computer executable code that, when executed by the processor, causes the processor to perform:
obtaining a code table that determines codes to a plurality of pixels on a predetermined size of area of a print medium, the codes being used for specifying a dot arrangement for each of the plurality of pixels;
determining one first offset value from K (K is an integer) number of first offset values, wherein (i) one part of the first offset values satisfies a condition that a remainder obtained by dividing each one part of the first offset values by a predetermined number of pixels corresponding to the predetermined size varies with each other, and (ii) the other part of the first offset values satisfies a condition that each remainder obtained by dividing each of the other part of the first offset values by the predetermined number coincides with one of the remainder of the one part of the first offset values;
determining, in a case where the determined first offset value is included in the other part of the first offset values, one second offset value, as a substitute for the determined first offset value, from second offset values which varies in accordance with a position of the predetermined size area;
offsetting the codes in the code table on the basis of the determined first offset value or the determined second offset value for at least one direction;
generating dot data for the image to be formed on the predetermined size of area on the basis of multivalued data and the offset code table; and
forming the image on the print medium based on the generated dot data.

2. The data processing apparatus according to claim 1, wherein the processor further performs offsetting the codes in the code table for each of levels of the multivalued data.

3. The data processing apparatus according to claim 1, wherein the processor further performs:
counting a count value so as to increment the count value each time a position of the predetermined size area shifts and reset the count value to an initial value when the count value reaches the predetermined number; and
determining, in a case where the one first offset value is determined among the other part of the first offset values,
the one second offset value to the count value.

4. The data processing apparatus according to claim 1, wherein the processor further performs obtaining a first code table whose size is power of 2 in a case where a type of dot is a first type of dot, and obtaining a second code table whose size is not power of 2 in a case where a type of dot is a second type of dot different from the first type of dot.

5. The data processing apparatus according to claim 4, wherein the first type of dot and the second type of dot have different color from each other.

6. The data processing apparatus according to claim 1, wherein the processor further performs determining the one first offset value from K number of first offset values with equal probability.

7. The data processing apparatus according to claim 6, wherein the processor further performs determining in a case where the first offset value is determined among the other part of the first offset values, the one second offset value from second offset values with equal probability.

8. The data processing apparatus according to claim 1, further comprising a controller which executes recording of the image by using a printing unit on the print medium based on generated dot data.

9. The data processing apparatus according to claim 8, further comprising the printing unit.

10. The data processing apparatus according to claim 1, wherein K is power of 2.

11. The data processing apparatus according to claim 1, wherein K is indivisible by the predetermined number.

12. The data processing apparatus according to claim 1, wherein the one part of the first offset values satisfies a condition that a quotient obtained by dividing each of the one part of the first offset values by the predetermined number are 0.

13. The data processing apparatus according to claim 1, wherein the other part of the first offset values satisfies a condition that a quotient obtained by dividing each of the other part of the first offset values by the predetermined number are 1.

14. The data processing apparatus according to claim 1, wherein the second offset values satisfies a condition that a quotient obtained by dividing each of the second offset values by the predetermined number are 0.

15. The data processing apparatus according to claim 1, wherein the processor further performs: (i) offsetting the codes in the code table on the basis of the determined first offset value in a case where the determined first offset value is included in the one part of the first offset values, and (ii) offsetting the codes in the code table on the basis of the determined second offset value in a case where the determined first offset value is included in the other part of the first offset values.

16. The data processing apparatus according to claim 1, wherein the processor further performs:
obtaining a plurality of dot arrangement patterns which determine a number and position of dots in each of the plurality of pixels in accordance with levels of the multivalued data; and
generating dot data by (i) determining a dot arrangement pattern from the plurality of dot arrangement patterns on the basis of the offset code table, and (ii) applying the determined dot arrangement pattern to multivalued data.

17. A print data generating method executed by a processor of a data processing apparatus, comprising:
obtaining a code table that determines codes to a plurality of pixels on a predetermined size of area of a print medium, the codes being used for specifying a dot arrangement for each of the plurality of pixels;
determining one first offset value from K (K is an integer) number of first offset values, wherein (i) one part of the first offset values satisfies a condition that a remainder obtained by dividing each one part of the first offset values by a predetermined number of pixels corresponding to the predetermined size area varies with each other, and (ii) the other part of the first offset values satisfies a condition that each remainder obtained by dividing each of the other part of the first offset values by the predetermined number coincides with one of the remainder of the one part of the first offset values;

determining, in a case where the determined first offset value is included in the other part of the first offset values, one second offset value, as a substitute for the first determined first offset value, from second offset values which varies in accordance with a position of the predetermined size of area;

offsetting the codes in the code table on the basis of the determined first offset value or the determined second offset value for at least one direction;

generating dot data for the image to be formed on the predetermined size of area on the basis of multivalued data and the offset code table; and forming the image on the print medium based on the generated dot data.

18. The print data generating method according to claim 17, further comprising offsetting the codes in the code table for each of levels of the multivalued data.

19. The print data generating method according to claim 17, further comprising:

counting a count value so as to increment the count value each time a position of the predetermined size of area shifts and reset the count value to an initial value when the count value reaches the predetermined number; and determining, in a case where the one offset value is determined among the other part of the first offset values, the one second offset value to the count value.

20. The print data generating method according to claim 17, further comprising obtaining a first code table whose size is power of 2 in a case where a type of dot is a first type of dot, and obtaining a second code table whose size is not power of 2 in a case where a type of dot is a second type of dot different from the first type of dot.

21. The print data generating method according to claim 20, wherein the first type of dot and the second type of dot have different color from each other.

22. The print data generating method according to claim 17, further comprising determining the one first offset value from K number of first offset values with equal probability.

23. The print data generating method according to claim 22, further comprising determining, in a case where the first offset value is determined among the other part of the first offset values, the one second offset value from second offset values with equal probability.

24. The print data generating method according to claim 17, wherein K is power of 2.

25. The print data generating method according to claim 17, wherein K is indivisible by the predetermined number.

26. The print data generating method according to claim 17, wherein the one part of the first offset values satisfies a condition that a quotient obtained by dividing each of the one part of the first offset values by the predetermined number are 0.

27. The print data generating method according to claim 17, wherein the other part of the first offset values satisfies a condition that a quotient obtained by dividing each of the other part of the first offset values by the predetermined number are 1.

28. The print data generating method according to claim 17, wherein the second offset values satisfies a condition that a quotient obtained by dividing each of the second offset values by the predetermined number are 0.

29. The print data generating method according to claim 17, further comprising: (i) offsetting the codes in the code table on the basis of the determined first offset value in a case where the determined first offset value is included in the one part of the first offset values, and (ii) offsetting the codes in the code table on the basis of the determined second offset value in a case where the determined first offset value is included in the other part of the first offset values.

30. The print data generating method according to claim 17, further comprising:

obtaining a plurality of dot arrangement patterns which determine a number and position of dots in each of the plurality of pixels in accordance with levels of the multivalued data; and generating dot data by (i) determining a dot arrangement pattern from the plurality of dot arrangement patterns on the basis of the offset code table, and (ii) applying the determined dot arrangement pattern to multivalued data.

* * * * *